United States Patent [19]

Girard et al.

[11] 4,162,374

[45] Jul. 24, 1979

[54] VOICE-SWITCHED TELEPHONE SET

[76] Inventors: Jean-Philippe Girard, 2, rue Pierre-Joseph Redouté, 92360 Meudon-La-Foret, France; Antoine Bernard, 57, Rue du Professeúr Einstein, 94260 Fresnes, France

[21] Appl. No.: 865,692

[22] Filed: Dec. 29, 1977

[30] Foreign Application Priority Data

Dec. 31, 1976 [FR] France .................. 76 39791

[51] Int. Cl.² .......................................... H04M 9/08
[52] U.S. Cl. ....................................... 179/1 HF
[58] Field of Search .................. 179/1 HF, 81 B

[56] References Cited

U.S. PATENT DOCUMENTS

| | | | |
|---|---|---|---|
| 3,046,354 | 7/1962 | Clemency | 179/1 HF |
| 3,787,621 | 1/1974 | Barok | 179/1 HF |
| 4,049,911 | 9/1977 | Schlaff et al. | 179/1 HF |

Primary Examiner—Kathleen H. Claffy
Assistant Examiner—E. S. Kemeny
Attorney, Agent, or Firm—Abraham A. Saffitz

[57] ABSTRACT

A telephone amplifier and attenuator circuit comprising an amplifier and an attenuator inserted in the transmit channel and an attenuator inserted in the receive channel of a telephone set. The speech signals conveyed by the transmit and receive channels are detected and added together for forming a sum control signal. The transmit amplifier is controlled by the detected transmit signal and the two attenuators are controlled in opposite directions by the sum control signal. In the preferred embodiment, the amplifier and attenuators are formed respectively by a balanced modulator and by balanced modulators inserted in the loop of negative feed back amplifiers.

1 Claim, 4 Drawing Figures

VOICE-SWITCHED TELEPHONE SET

BACKGROUND OF THE INVENTION

1. Field of the Invention

This invention relates generally to voice switched telephone amplifier circuits of the type especially used in microphone and loudspeaker telephone sets or speakerphone and loudspeaker telephone sets, sometimes known as "hand-free" telephones.

2. Description of the Prior Art

In a telephone set using a loudspeaker, it is necessary (i) to provide a constant signal amplification within the telephone set for supplying increase gain to the receive signal or to both the transmit and the receive signal and (ii) to provide a variable attenuation for the minimization or complete prevention of undesirable transfer of energy of speech signals between the receiving loudspeaker and the transmitting microphone of the telephone set. This is generally obtained by inserting in the transmitted speech circuit and in the listening circuit a constant gain amplifier and a variable loss attenuator and by controlling the attenuators in opposite directions by the detected received signal. When the detected received signal increases, the speech circuit attenuation is made to decrease and the listening circuit attenuation is made to increase.

Adding transmit and receive gain in a telephone set causes the sidetone signal which is heard in the loudspeaker to increase by the sum of the transmit and receive gains. If the sidetone signal increases to an objectionable level, it becomes ennoying to the user who has a tendency to lower his voice thus counteracting the purpose of the additional auxiliary amplification. U.S. Pat. No. 3,963,876 issued June 15, 1976 to Roger Edward HOLTZ et al. disclosed a voice switched telephone set comprising a transmit amplifier in the transmit circuit, a receive amplifier in the receive circuit, means for forming the sum of the in-phase transmit and receive signals in the hybrid netword of the telephon set and means for controlling the receive amplifier by this sum signal whereby the amplification of the receive amplifier is attenuated thus providing sidetone control and gain control.

SUMMARY OF THE INVENTION

According to the present invention, a voice switched circuit for telephone set comprises a transmit circuit including a transmit attenuator and a transmit amplifier for the transmit signals which are both voltage controlled; a receive circuit including a voltage controlled attenuator for the receive signals; means for detecting the transmit signal and the receive signal available at the outputs of the respective attenuators; means for controlling the gain of the transmit amplifier by the detected transmit signal; and means for summing the detected transmit signal and receive signal and for controlling in the reverse sense, by the sum of the signals, the attenuation for the transmit attenuator and the receive attenuator.

It is to be noticed that the transmit amplifier has its gain controlled by its own input signal which makes its output signal substantially constant in respect of the input signal variations. Further the two attenuators which allow for insertion loss in the transmit and receive channels are first controlled by their own detected output signal in order to have said output signals varied in the direction of the input signal. They are also controlled by the signal in the other channel in order to have their output signals varied in the direction opposite to that of said other channel signal. It can be said that attenuation is decreased in the channel which is speaking and is increased in the channel which is not speaking.

BRIEF DESCRIPTION OF THE DRAWINGS

An embodiment of the invention will now be described, by way of example, with reference to the accompanying drawings, in which.

DESCRIPTION OF THE PREFERRED EMBODIMENT

Figure 1:
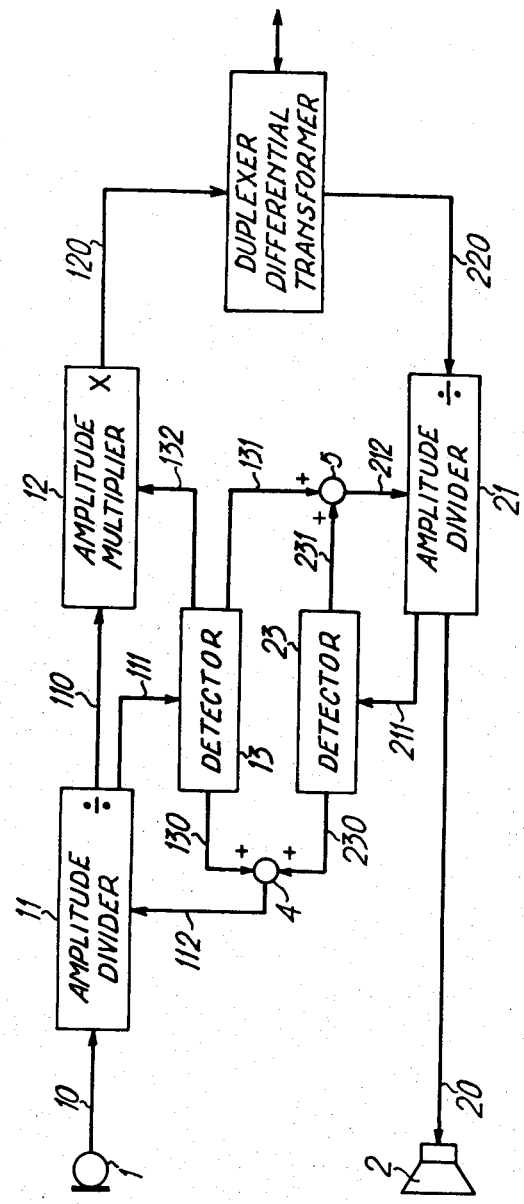
FIG. 1 is a block diagram of a loudspeaker telephone apparatus according to the invention.

Referring to FIG. 1, a telephone equipment of the loudspeaking or "hands-free type" includes a microphone 1, a loudspeaker 2 and a duplexer 3 formed for example by a hybrid or differential transformer. The speech is transmitted on a line 10, and the incoming speech is received on a line 20. An amplitude divider 11 and an amplitude multiplier 12 are connected in the speech transmitted circuit and an amplitude divider 21 is connected in the receiving circuit.

The speech signals from the amplitude divider 11 and the listening signals from the amplitude divider 21 are detected in detectors 13 and 23, respectively, to which they are connected by respective connections 111 and 211. The detected signals from the detector 13 are fed to a gain control terminal of the amplitude multiplier 12 via a connection 132 in such a sense as to increase the gain when the detected signal increases. The signals which are detected, respectively, in the detectors 13 and 23 are added in an adding circuit 4 to which they are fed, respectively, by connections 130 and 230, and are added in a adding circuit 5 to which they are fed, respectively, by connections 131 and 231. The sum signals are fed to attenuation control terminals of the amplitude dividers 11 and 21 via connections 112 and 212, in such a sense as to increase the attenuation when the sum signal increases.

It will be seen that the amplitude dividers 11 and 21 are controlled on the one hand by their own circuit signals in order to make the amplitude of their output signals substantially constant, and on the other hand by the signal of the other circuit in order to increase the attenuation of the circuit which is not speaking. Circuit switching therefore operates on the signals the dynamics of which have been heavily restricted.

Figure 2:
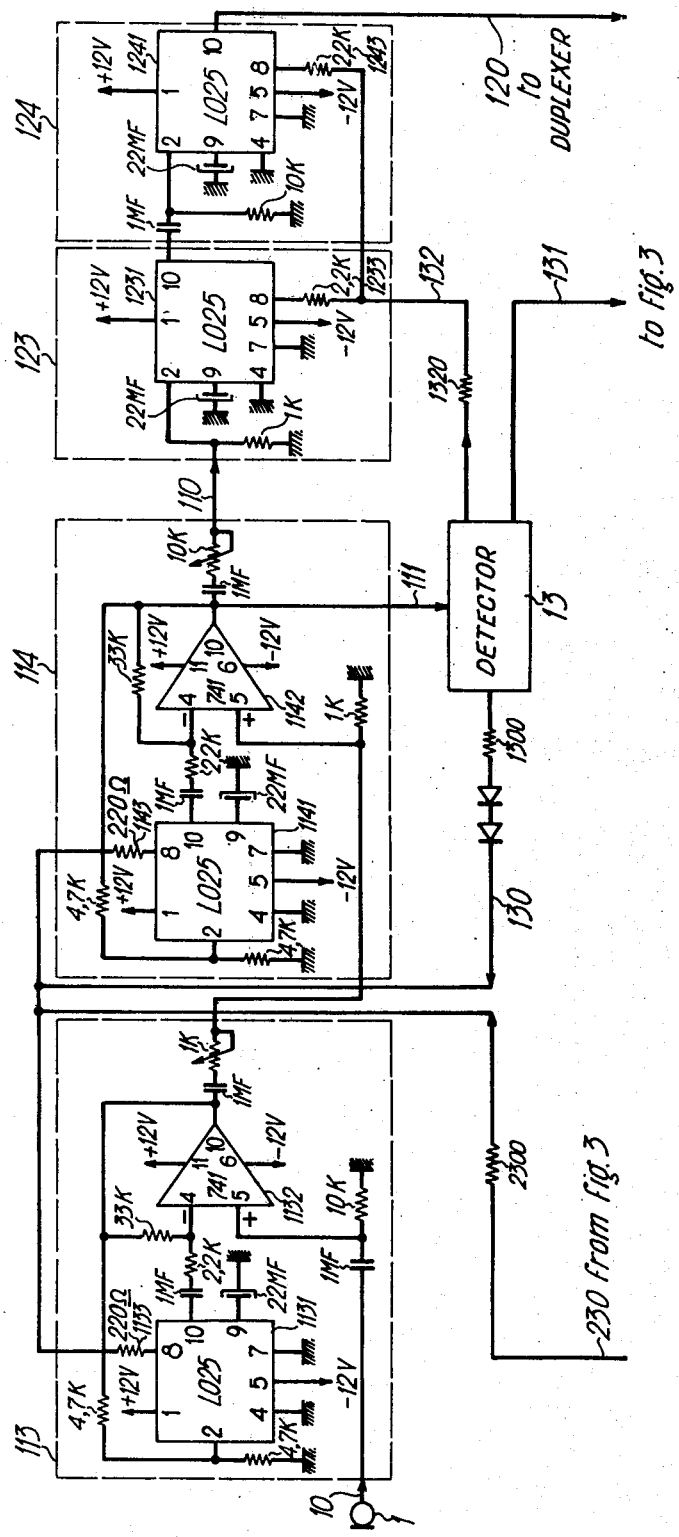
FIG. 2 is a circuit diagram of a speech transmitter.
Figure 3:
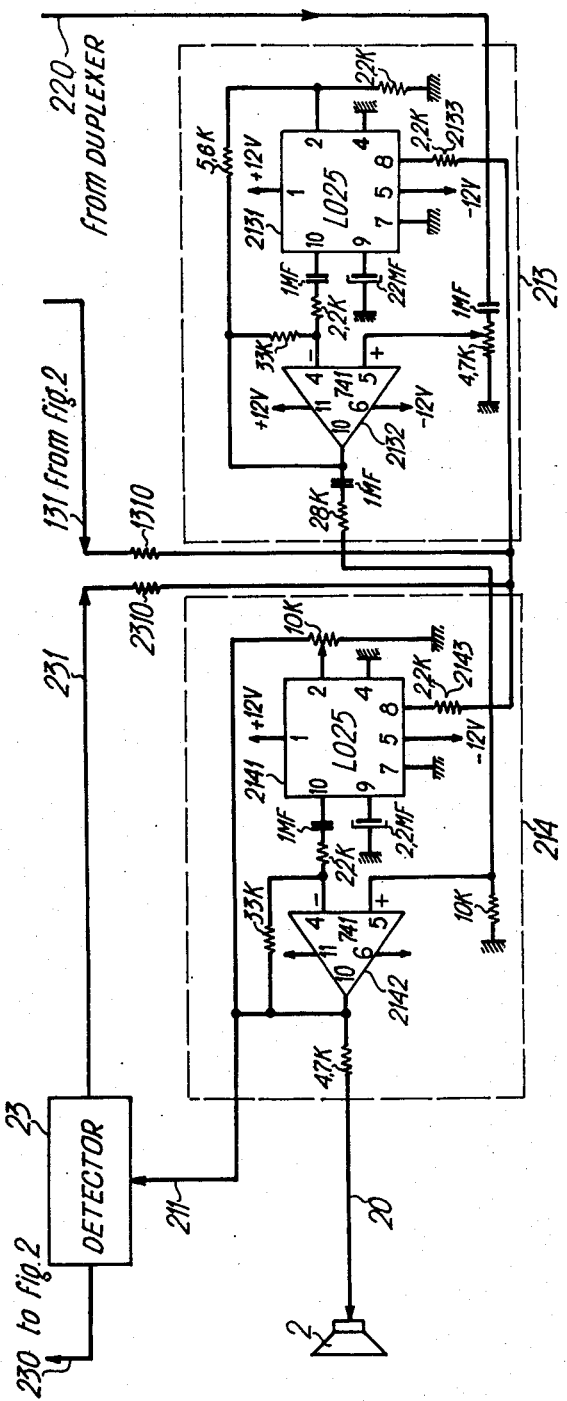
FIG. 3 is a circuit diagram of a receiving circuit and, FIG. 4 is a diagram of an LO25 balanced modulator integrated circuit.
Figure 4:
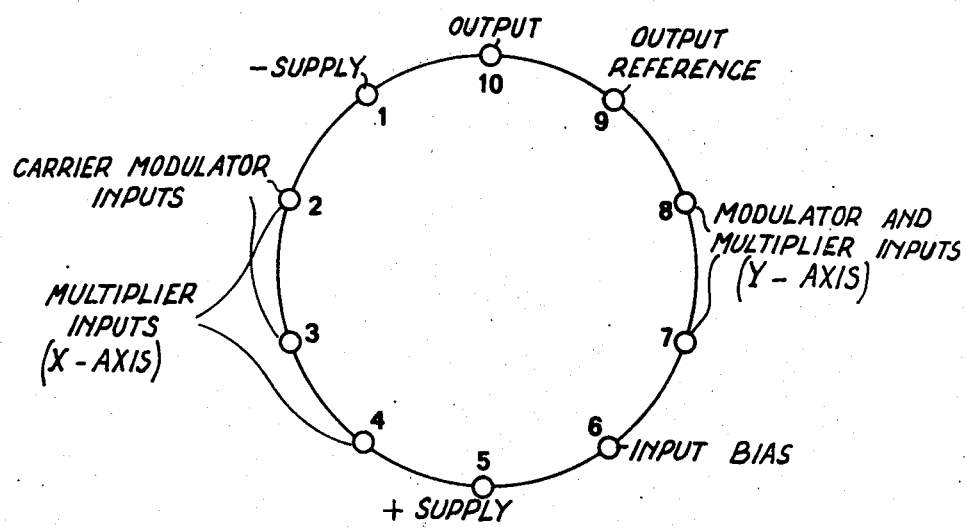

The amplitude multiplier in FIGS. 2 and 3 is a double sideband modulator with carrier suppression, of the type LO25 manufactured by S.G.S. Laboratories, an Italian Company of Agate-Brianza, Italy and the amplitude divider is this same balanced modulator which is connected in the negative feedback circuit of an amplifier type 741 made by the same company. The LO25 is an integrated circuit the connections of which are shown in FIG. 4. These connections are as follows:

| Terminals | Functions |
|---|---|
| 1 | + feed voltage |

| Terminals | Functions |
|---|---|
| 2 } 3 | Carrier signal |
| 4 | Multiplier input (X axis) |
| 5 | — feed voltage |
| 6 | Bias |
| 7 } 8 | Modulating signal and multiplier input (Y axis) |
| 9 | Reference output signal |
| 10 | Output signal |

The LO25 circuit is used as a multiplier or a divider of an alternating signal (the transmitted speech or the received signal) by a d.c. voltage (the detected received or transmitted speech signal).

Referring to FIG. 2, the output signal from the microphone 1 is fed via the line 10 to stages of amplitude division 113 and 114 which are in cascade and which make up the amplitude divider 11. Each of these two amplitude division stages is made up of a type LO25 balanced modulator, 1131 and 1141 respectively, each of which is connected in the negative feedback circuit of an amplifier type 741, these being referenced, respectively, 1132 and 1142. Connections 130 and 230 which originate, respectively, from the detectors 13 and 23 are connected to two adding circuits formed by resistances 1300, 2300 and 1133 on the one hand and 1300, 2300 and 1143 on the other hand. The outputs of these adding circuits are connected, respectively, to terminals of the LO25 integrated circuits 1131 and 1141.

The output from the amplitude division stage 114 is connected to the detector 13 via the connection 111 and to the amplitude multiplier 12 via the connection 110.

The amplitude multiplier 12 is made up of two cascade-connected amplitude multiplication stages 123 and 124, each formed by a balanced modulator of the LO25 type, respectively 1231, 1241.

The output 120 from the stage 124 is connected to the differential transformer 3. A connection 132 from the detector 13 is coupled to terminal 8 of each of the LO25 integrated circuits 1231 and 1241.

Referring to FIG. 3, the output signal from the differential transformer 3 is fed via the line 220 to two amplitude division stages 213 and 214 in cascade which make up the amplitude divider 21. Each of these two amplitude division stages comprises a type LO25 balanced modulator, 2131 and 2141 respectively, connected in the negative feedback circuit of an amplifier type 741, referenced 2132 and 2142 respectively. The output from the amplitude division stage 214 is connected to the detector 23 via the connection 211, and to the loudspeaker 2 via the line 20.

The connection 230 from the detector 23 goes to the addition circuits (1300, 2300, 1133) and (1300, 2300, 1143) (FIG. 2) and the connection 231 goes to the addition circuit 5. The latter is made up of addition circuits (1310, 2310, 2133) and (1310, 2310, 2143).

In the speech transmission and listening circuits only those attenuators and amplifiers which are of use for voice switching have been shown. Obviously, supplementary amplifiers can be used which have variable or fixed gains but which are not controlled by the voice.

What we claim is:

1. A loudspeaker telephone set comprising:
   a transmitter channel comprising in series a microphone, transmitter attenuator, transmitter amplifier, and duplexer;
   a receiver channel comprising in senes said duplexer, receiver attenuator, and loudspeaker;
   means for detecting a transmitter channel speech signal present at the transmitter attenuator output;
   means for detecting a receiver channel speech signal at the receiver attenuator output;
   means for adding said detected transmitter and receiver speech signals, thereby forming a summed signal;
   means for connecting said summed signal to a control terminal on each of said transmitter attenuator and receiver attenuator, and
   said transmitter amplifier means comprising an amplifier multiplier formed by a balanced modulator having two inputs respectively receiving the transmitter channel speech signal and the detected transmitter channel speech signal.

* * * * *